Figure 1:
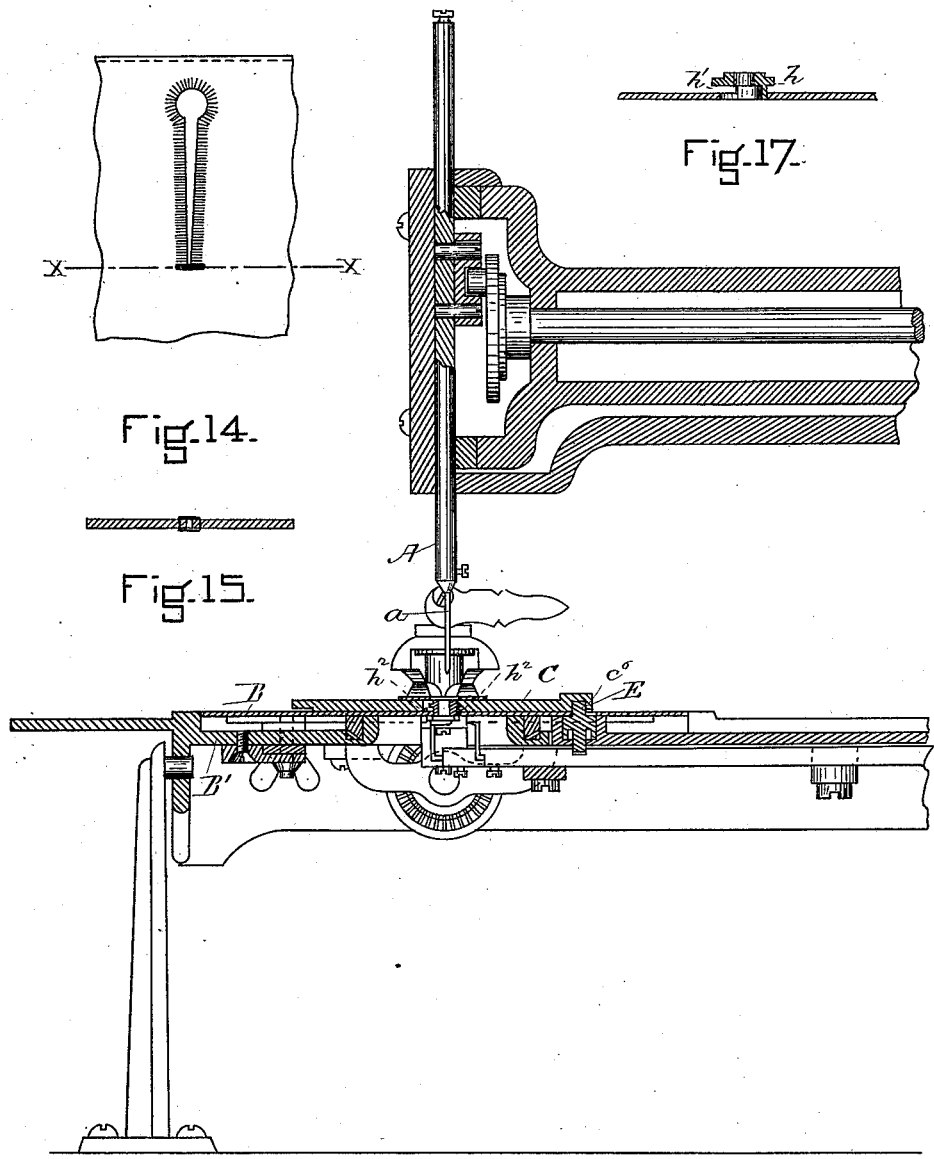

(No Model.) 6 Sheets—Sheet 1.

J. H. REED.
BUTTON HOLE STITCHING MACHINE.

No. 357,537. Patented Feb. 8, 1887.

WITNESSES
J. M. Dolan.
Fred. B. Dolan.

INVENTOR
James H. Reed
by his attys
Clarke & Raymond

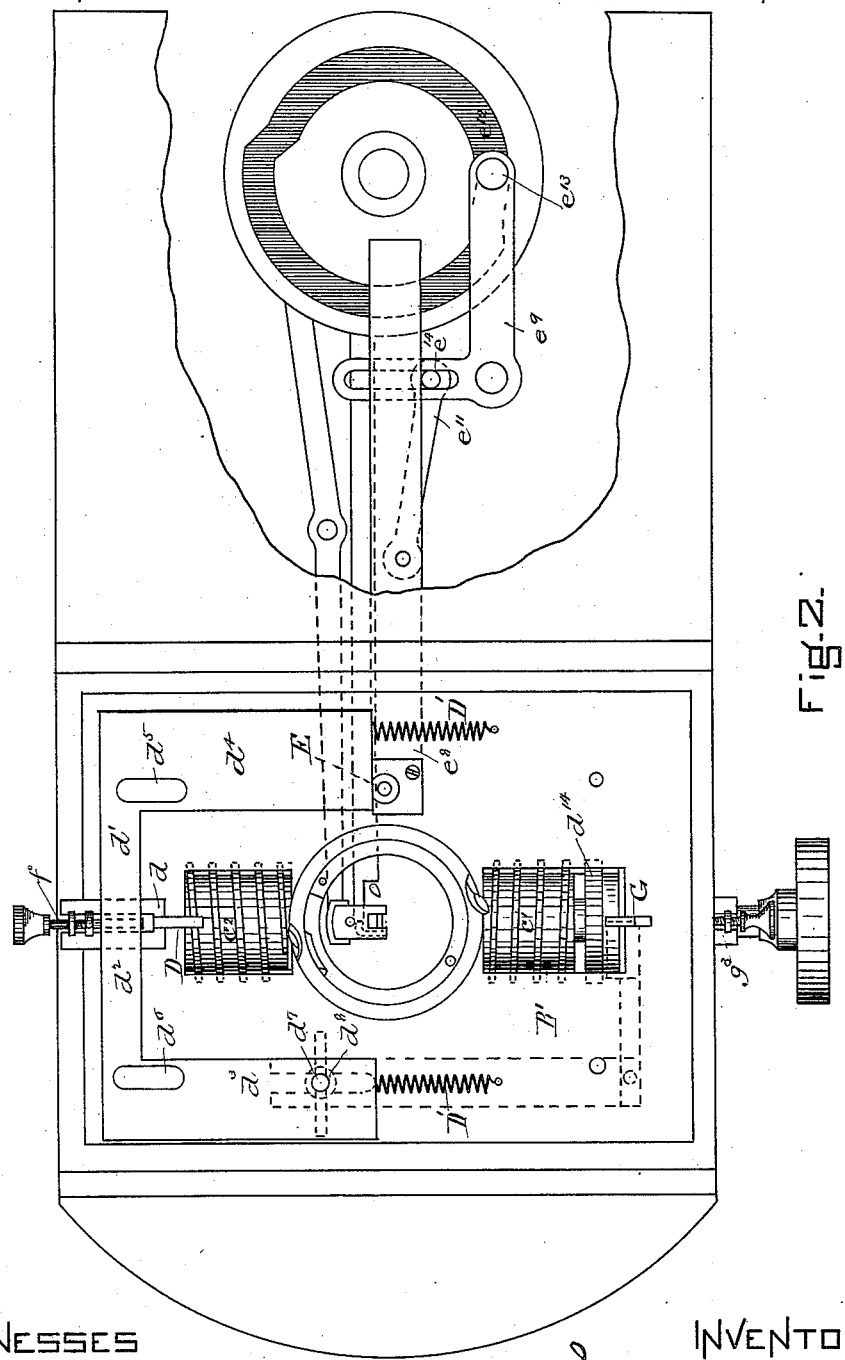

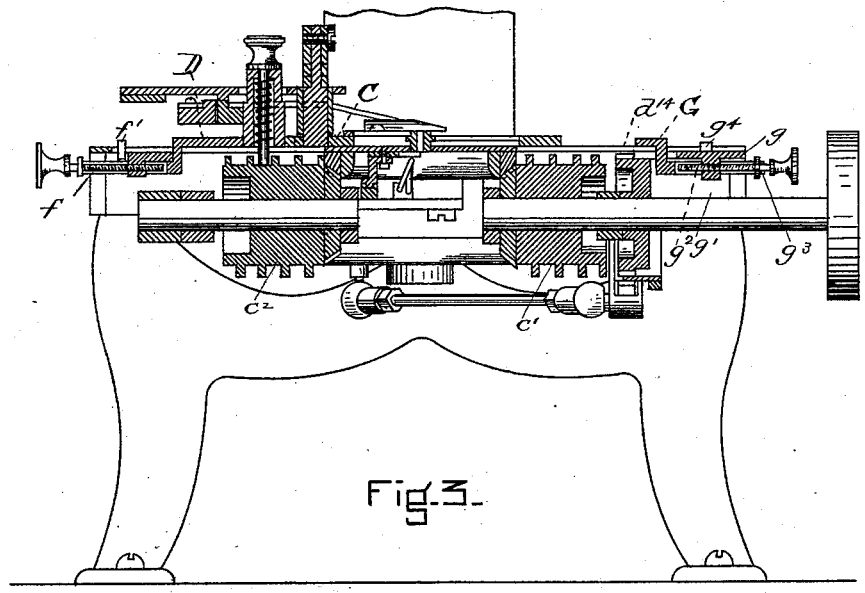
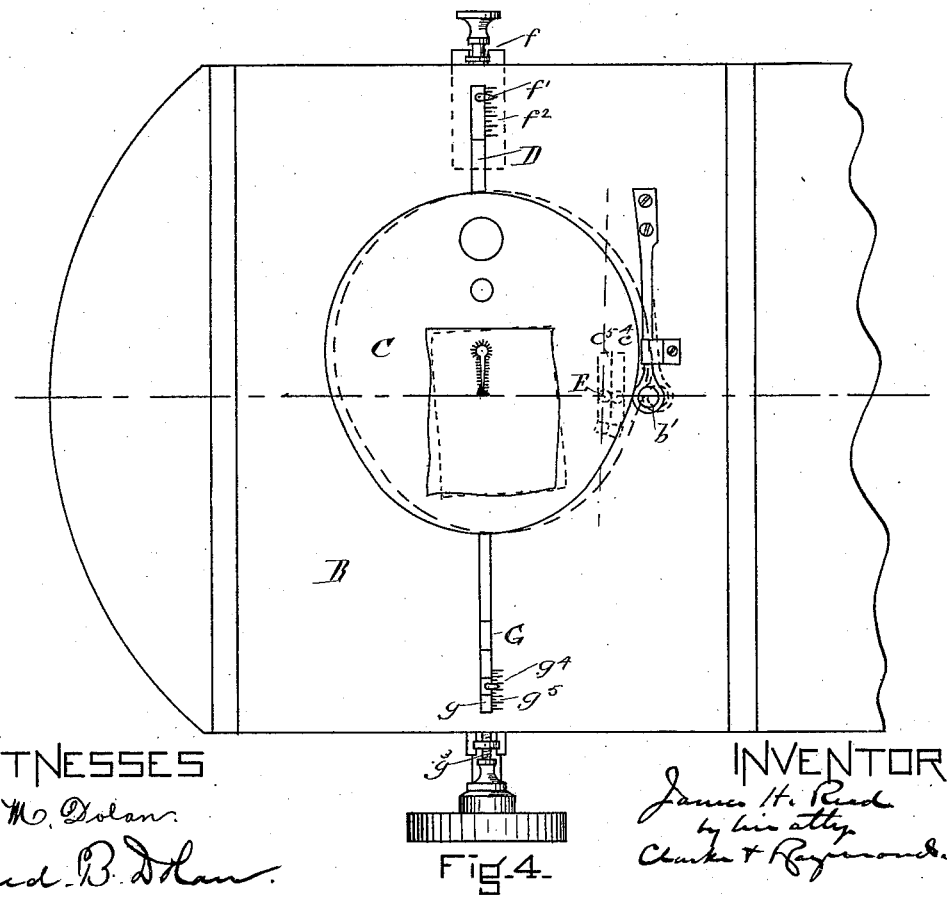

(No Model.) 6 Sheets—Sheet 4.
J. H. REED.
BUTTON HOLE STITCHING MACHINE.
No. 357,537. Patented Feb. 8, 1887.
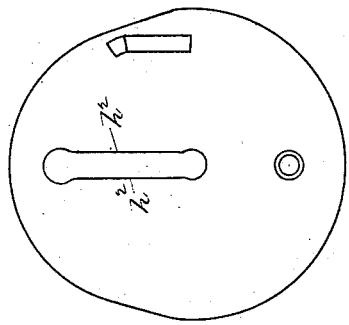
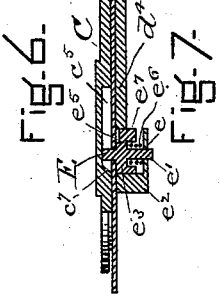
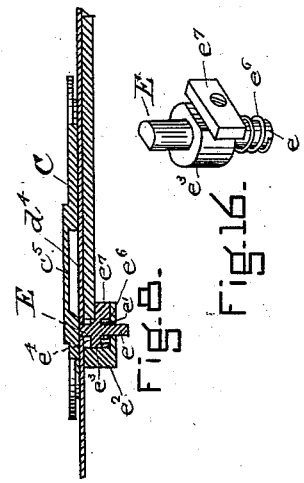
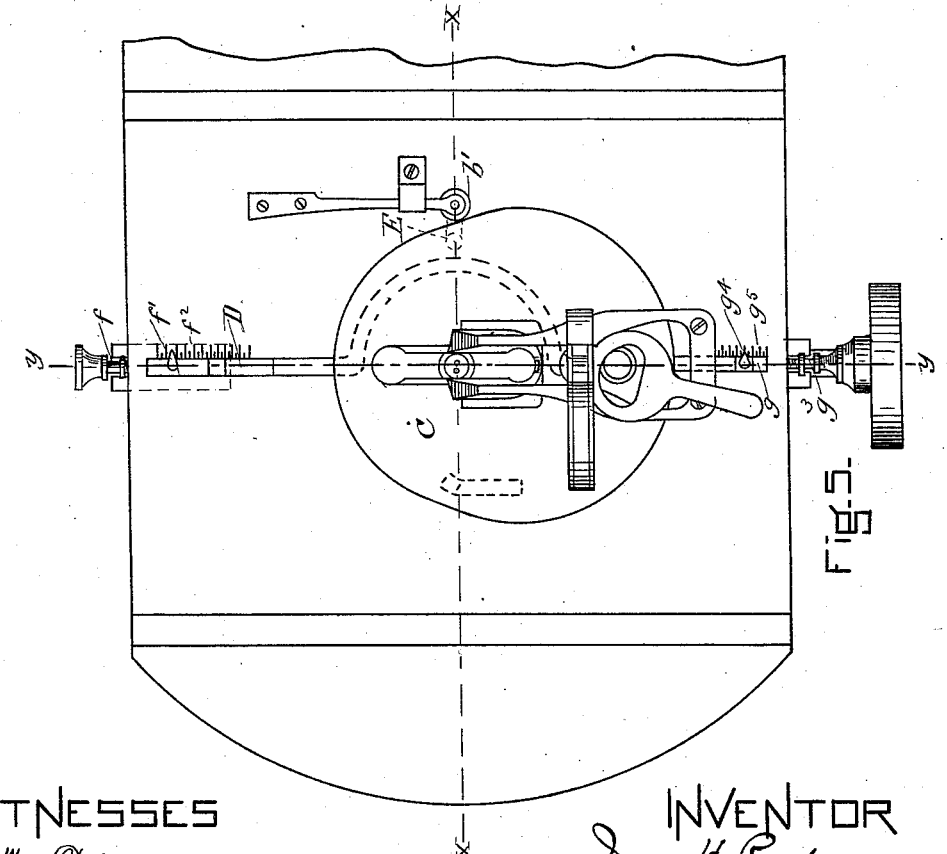
WITNESSES
J. M. Dolan.
Fred. B. Dolan.
INVENTOR
James H. Reed
by his attys
Clarke + Raymond (No Model.) 6 Sheets—Sheet 5.
J. H. REED.
BUTTON HOLE STITCHING MACHINE.

No. 357,537. Patented Feb. 8, 1887.

WITNESSES.
J. M. Dolan.
Fred. B. Dolan.

INVENTOR.
James H. Reed
by his attys.
Clarke & Raymond.

(No Model.) 6 Sheets—Sheet 6.

J. H. REED.
BUTTON HOLE STITCHING MACHINE.

No. 357,537. Patented Feb. 8, 1887.

WITNESSES
J. M. Dolan,
Fred. B. Dolan.

INVENTOR
James H. Reed
by his attys
Clark & Raymond.

N. PETERS, Photo-Lithographer, Washington, D. C.

UNITED STATES PATENT OFFICE.

JAMES H. REED, OF LYNN, MASSACHUSETTS.

BUTTON-HOLE-STITCHING MACHINE.

SPECIFICATION forming part of Letters Patent No. 357,537, dated February 8, 1887.

Application filed October 7, 1886. Serial No. 215,520. (No model.)

*To all whom it may concern:*

Be it known that I, JAMES H. REED, of Lynn, in the county of Essex and State of Massachusetts, a citizen of the United States, have invented a new and useful Improvement in Button-Hole-Stitching Machines, of which the following is a full, clear, and exact description, reference being had to the accompanying drawings, forming a part of this specification, in explaining its nature.

The invention is in some respects an improvement upon that described in Letters Patent of the United States granted E. M. Phelps, No. 344,678, dated June 29, 1886; and it relates especially to means, substantially as hereinafter indicated, for stitching the sides and eye of the button-hole, and for automatically sewing the bar across the rear end thereof, or that end opposite the eye.

It further relates to mechanism, substantially as herein indicated, whereby the barring operation of the machine follows the stitching of the sides and eye of the button-hole without stopping the machine—that is, the operation of stitching the sides and eye and of barring are continuous and automatic.

It further relates to means, substantially as herein specified, for disconnecting the devices for operating the clamp-plate feed from said feeding mechanism, so that the feed of the clamp-plate is automatically stopped during the operation of barring the button-hole.

It further relates to the employment of a clamp-plate pin as a pivot upon which the clamp-plate is reciprocated or oscillated during the barring of the button-hole.

It further relates to the mechanism or devices for automatically engaging the clamp-plate, and reciprocating or oscillating it after the sides and eye of the button-hole have been stitched, and moving the work forward and back beneath the needle.

It further relates to an automatic tripping device whereby the feed-pawl for operating the clamp-plate feed is caused to be tripped, or to be held from the ratchet-wheel by the action of the clamp-plate or contact of the clamp-plate with the stop.

It further relates to an automatic tripping device operated by the clamp-plate for bringing into action a vibrating or oscillating block or pin, for vibrating, oscillating, or reciprocating the clamp-plate, and for the purposes of forming the bar.

It further relates to mechanism for returning the stop and vibrating clamp-plate barring pin or block to their original or normal positions.

It further relates to means for adjusting the tripping-block, whereby the length of the button-hole to be stitched may be fixed, and of an indicator and scale used in connection with this adjustable stop for the purpose of indicating to the operator the extent of movement which it is desired to give the stop in order to secure a stitched button-hole of a given length.

It further relates to an adjustable stop at the front end of the clamp-plate guiding-slot for regulating and adjusting the position from which the clamp-plate shall start, and against which its pin is brought in contact upon moving it backward at the completion of the stitching of a button-hole and preparatory to stitching another.

It further relates to various details of construction, all of which will hereinafter be explained.

Figure 7:
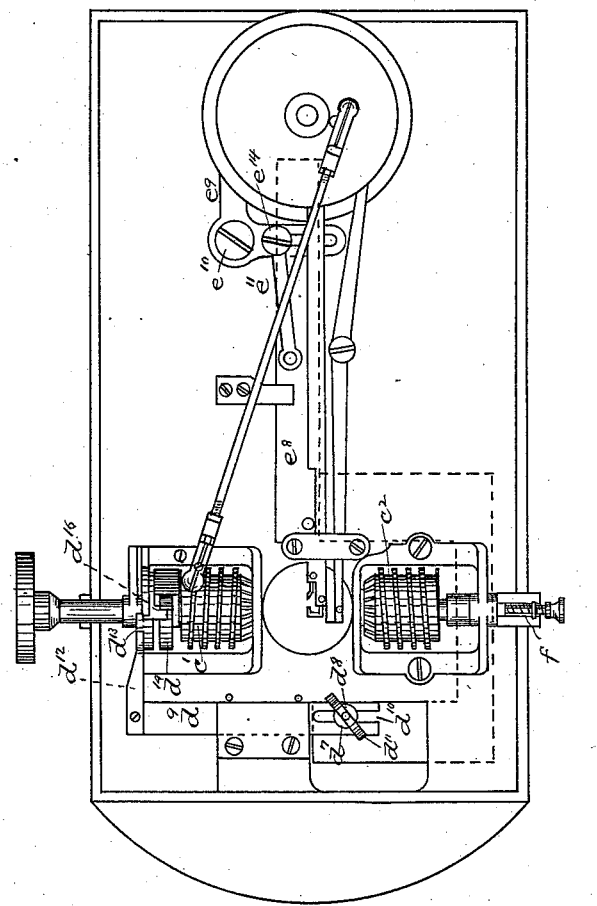
Figure 10:
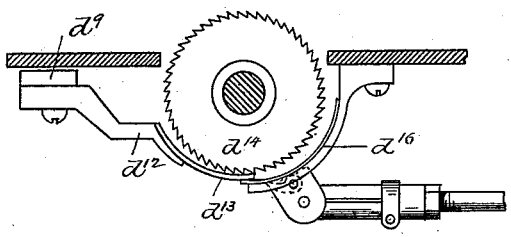
Figure 11:
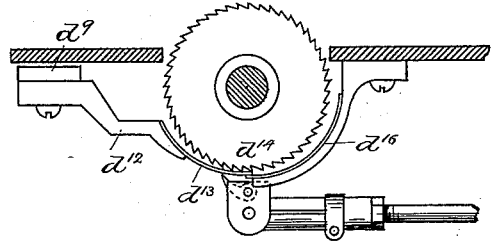
Figure 12:
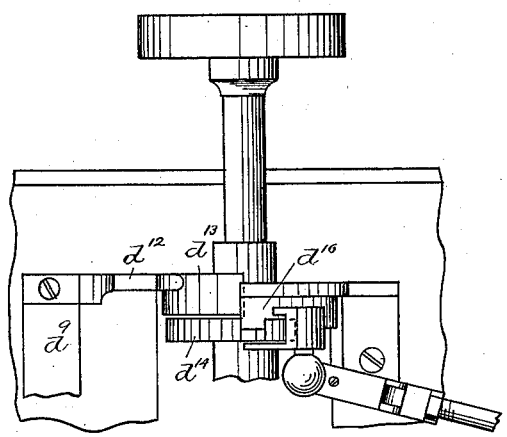
Figure 13:
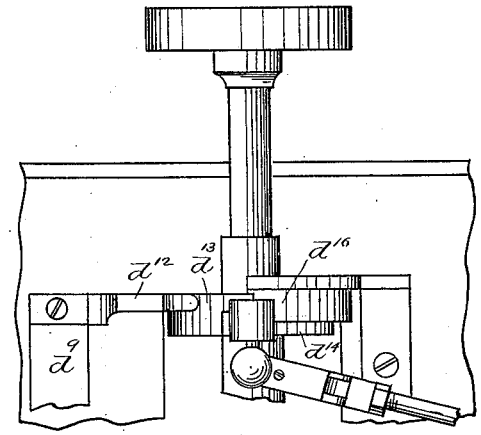

Referring to the drawings, Figure 1 is a view of the machine in vertical section on the line *x x* of Fig. 5, representing the clamp-plate as engaged with the device for automatically reciprocating or moving it intermittingly during the operation of barring or staying the end of the button-hole. Fig. 2 is a plan view of the machine, the clamp-plate beneath the work-plate, a portion of the bed being broken out to show a part of the operative mechanism beneath. Fig. 3 is a view in vertical section upon the line *y y* of Fig. 5, showing the position of the clamp-plate and its guiding-pin in relation to the feeding mechanism while it is being reciprocated or moved to bar or stay the button-hole. Fig. 4 is a plan view of a portion of the clamp-plate and of the work-plate, showing in full and dotted lines the extent of movement of the clamp-plate and material in the operation of barring or staying the end of the button-hole. Fig. 5 is a plan view showing the position of the clamping-plate and clamp at the beginning of the stitching operation. Fig. 6 is a view in plan of the clamp-plate inverted. Figs. 7 and 8 are detail views, in section, to further illustrate the construction and operation of the devices for moving or oscillating the clamp-plate in barring or staying button-holes. Fig. 9 is a plan view of the operative devices below the bed-plate of the machine inverted. Figs. 10, 11, 12, and 13 illustrate the construction and operation of the feed-pawl tripping or disengaging devices hereinafter described. Fig. 14 is a plan view of a complete button-hole, showing the stay or bar at the end. Fig. 15 is a section upon the line $x\ x$ of Fig. 14. Fig. 16 is a perspective view of the clamp-plate-engaging device hereinafter described. Fig. 17 is a vertical section of the throat-plate and work-plate immediately adjacent.

The mechanism for operating the needle-bar, the throat-plate, the clamp-plate feeding device, and stitch-forming devices are like or similar to those described in the said Phelps application, and need not further be specifically referred to herein.

A is the needle-bar of the machine; $a$, the needle; B, the work-plate, which is like that described in said application, and which has a clamp-plate-guiding slot, $b$, like that therein described.

$b'$ is the spring-held roll, which bears against the edge of the clamp-plate.

C is the clamp-plate, which has the spring-pin $c$ arranged to enter the clamp-plate slot $b$.

$c'\ c^2$ are the clamp-plate feed-wheels.

At or near the rear or back end of the clamp-plate slot $b$ there is arranged a movable block or tripping-stop, D, so placed as to be moved by the edge of the clamp-plate to trip the feed-operating devices. This stop is supported by the plate $d$ horizontally adjustable in the plate $d'$. This plate $d'$ is shaped in plan as represented in Fig. 2—that is, it has the end bar, $d^2$, and the two side bars, $d^3\ d^4$, and it is held or supported in a shallow recess between the bed B' and the work-plate B, the edges of the side bars bearing against the side edges of the recess. The plate $d'$ also has the slots $d^5\ d^6$, through which the screws for fastening the work-plate to the bed pass, and it is connected by means of the stud $d^7$, extending from the side bar $d^3$ through the hole $d^8$ in the bed-plate with slide bar $d^9$, which is arranged to slide or be moved in suitable bearings upon the under surface of the bed against the stress of the spring D', and has a slot, $d^{10}$, which receives the end of the stud $d^7$, which is a screw-stud provided with the nut $d^{11}$, and by means of which and the slot the position of the slide-plate $d'$ in relation to the stud is varied. The slide-plate $d'$ carries at its rear end an arm, $d^{12}$, which supports a laterally-extending thin curved piece of metal, $d^{13}$, so shaped and arranged as to cover upon the movement of the slide-bar the teeth of the feed ratchet-wheel $d^{14}$, or that wheel with which the reciprocating feed-pawl engages in operating the feed rolls or wheels $c'\ c^2$. (See Figs. 10, 11, 12, and 13.)

The feed-pawl is arranged to ride off the ratchet-wheel upon its backward movement onto a thin plate, $d^{15}$, extending over the ratchet-teeth, and the movable ratchet-teeth-covering plate $d^{13}$ has one end extending under this fixed plate $d^{16}$, so that when it is pushed in to cover the ratchet-wheel teeth the pawl, upon its forward feed movement, rides from the stationary plate onto this other plate, and is held thereby from engaging with the ratchet-teeth. It is therefore obvious that upon the movement of this covering-plate or pawl-disengaging device into position over the ratchet-wheel the pawl no longer acts to operate the feed rolls or wheels, and that they must therefore become stationary and remain stationary until the covering-plate has been withdrawn; and it is obvious that by thus disengaging the feed-operating pawl, so that the feed is stopped, the sewing or stitching operation of the machine can still continue, and this is, in fact, the operation of the machine. After the disengagement of the feed-pawl from the feed ratchet-wheel the clamp-plate is immediately vibrated or oscillated to move the end of the button-hole back and forth beneath the needle, which continues its stitching and forms a bar or stay across the end of the button-hole, as many cross-stitches being taken as may be desired.

To bring into operation devices for providing the clamping-plate with this oscillating or reciprocating movement, I connect the tripping-stop D, by means of its holding-plate $d'$ and the side bar $d^4$ thereof, with an intermittingly oscillating or vibrating pin, E, which is vertically movable in the bed and work-plate of the machine, and which is held latched down until it is necessary to bring it into engagement with a wall or shoulder of the clamp-plate, or formed upon an arm attached thereto, when it is automatically released or unlatched and moved upward sufficiently to bring its end into operative contact with said surface or shoulder. It preferably is shaped as represented in Fig. 16. It has the downward-extending section or stud $e$, which enters the guide-hole $e'$ in its holding-block $e^2$. It has the enlarged section $e^3$, which fits the enlarged portion $e^4$ of the hole in its holding-block. Between the shoulder $e^5$ and the under surface of this enlarged portion $e^4$ is arranged a coiled spring, $e^6$, which surrounds the post and serves to lift it upward when it is released, as hereinafter explained. To this enlarged portion there is attached or formed thereon a latch-block, $e^7$, which extends without the hole and upon which the end of the side bar $d^4$ closes to hold the pin in its lowest position and against the stress of the lifting-spring.

From the enlarged section $e^3$ of the device extends upward, through a slot in the work-plate, the pin E. The pin-holding block is constantly reciprocated during the operation of the machine, at intervals, by means of the sliding bar $e^8$, which carries the block supporting the spring-pin, which may be integral therewith or attached thereto, the bent lever $e^9$, pivoted at $e^{10}$, the link $e^{11}$, connecting one arm of the lever with the slide-bar, and the cam $e^{12}$, which receives the cam-pin $e^{13}$ upon the other arm of the lever.

The clamp-plate has the lateral extension $c^4$ (see Figs. 1 and 6) formed integral therewith or arranged separate and attached thereto, which has a recess, $c^5$, to form a shoulder or vertical surface or abutment, $c^6$. It also has the inclined surface $c^7$, the office of which is to depress or throw down the vibrating pin E after the barring has been completed and upon the movement of the clamp-plate back to its original position.

I would here remark that the backward movement of the tripping-stop D serves to bring into operative position the vibrating or reciprocating pin E, but by so doing is itself locked back from operative position by the pin, and that before it can be returned again to operative position it is necessary that the vibrating pin shall be depressed or moved out of operative position, and that this movement of the pin brings into operation the automatic latching-down or locking device which holds the pin depressed, and which also brings into operative position or moves forward the tripping-stop.

The back-tripping stop, as before mentioned, preferably is made adjustable in the plate $d'$, as its position in the clamp-plate slot determines the length of the button-hole, or, in other words, the position which it occupies at the instant the feed of the clamp-plate is stopped, and I have shown it, instead of being directly attached to plate $d'$ or formed integral therewith, which it may be, as formed upon the end of a slide-plate, $d$, which is movable on the plate $d'$ by a screw, $f$, attached by a collar or in any other way to the plate, and having a screw-stem which screws into a nut carried by the slide-plate. The slide-plate also carries a pointer or indicator, $f'$, and the bed-plate has a scale, $f^2$, which indicates, in connection with the pointer, the position to which the tripping-stop should be moved to stitch a button-hole of any given length. At the front end of the cam-plate slot I have arranged the stop G, which is attached to the front edge of the slide-plate $g$. This plate is attached to the bed or bed-plate in a manner to permit it to be moved backward and forward, and it has a nut, $g'$, which receives the screw-thread $g^2$ of the operating-screw $g^3$. This operating-screw is attached by a collar to the bed-plate of the machine. The slide-plate also carries a pointer or indicator, $g^4$, which is adapted to be used in connection with a scale, $g^5$, on the bed-plate to indicate the length of the stitching of the button-hole, the movement of the stop and indicator being of course governed by the scale, which correctly represents the position which the stop should occupy in adjusting the clamp-plate to stitch accurately various lengths of button-hole.

It will be seen that the length of the stitch-forming bar or stay can be varied by changing the position of the end of the link $e^{11}$ upon the arm $e^{14}$ of the lever upon said lever, the inward movement of the link toward the fulcrum of said lever giving a shorter bar, and an outward movement giving a longer bar; and the lever is represented as provided with a slot to permit these movements of the end of the link in relation thereto.

In operation, the front stop is adjusted to bring the indicator $g^4$ opposite the line of the scale bearing the length of the button-hole to be stitched. The clamping-plate is moved backward to bring its spring-pin in contact with the front stop. The material is placed on the plate and clamped. The rear tripping-stop is also properly adjusted for the length of the button-hole to be stitched. The machine is then set in operation and the clamping-plate is moved and turned, as described in said application, and the spring-roll $b'$ bearing against its edge serves to keep it in contact with the throat-plate. Upon the completion of the stitching of the last side of the button-hole the edge of the clamp-plate comes in contact with the tripping-stop and moves it backward sufficiently to trip the reciprocating or vibrating stud or pin E, and this backward movement of the stud also stops the feed by disengaging the feed-pawl from the feed ratchet-wheel, and holding it disengaged and the feed-wheel coming to rest. The spring-pin $c$ is held in position by the recess or groove in the feed-wheel $c^2$ and the side edges of the clamping-plate slot, which enables me to use the pin as the fulcrum of the clamping-plate and these parts as the pivot or fulcrum holder. The vibrating barring-pin having been released by the latch, moves upward and immediately enters the recess $c^5$ and engages the shoulders or edges thereof and moves the plate laterally and holds it while the needle takes a stitch in the part of the material brought beneath it. It then, upon the upward movement of the needle, moves backward and returns the plate to its original or normal position, or allows the spring-roll $b^5$ to do so, when the needle makes another stitch through the portion of the material which is then brought beneath it, which is across upon the line of the button-hole cut. The pin is then again moved to again move the vibrating plate, and the needle takes another stitch, and this backward and forward movement of the clamping-plate and of the material held thereby continues until enough cross-stitches have been taken to make the bar. After the barring, and upon the turning of the clamping-plate to bring it into its normal position, the inclined surface $c^7$ of the clamp-plate is brought in contact with the upper surface of the pin or stud, which is somewhat rounded or inclined at that point, and is pressed downward thereby sufficiently to cause its holding-latch to operate to hold it locked down, and this operation of the latch brings the tripping-stop into operative position and also uncovers the feed ratchet-wheel or releases the pawl, so that the pawl upon the starting of the machine is in position to operate the feed. I have called the pin or stud E an "oscillating" or "vibrating" stud. It does not, however, have a continuous oscillating or vibrating motion, for it has a period of rest at the end of each movement in one direction sufficiently long to enable the needle to make a stitch.

I would state that I do not confine myself to the especial form or application of the devices herein described for stopping the feed of the clamp-plate and for automatically bringing into operation the oscillating movement or feed of the clamp-plate, but may use any mechanical equivalent for said devices.

I would further state that I do not limit the application or use of this invention to the especial form of button-hole-stitching mechanism herein described, as the same results may be produced by the same or substantially the same organization of mechanism upon other button-hole-stitching machines.

It will be seen that the throat-plate has the recess $h\ h'$ upon its side, into which the edges $h^2$ of the throat-plate enter; also, that the recess $h'$ is sufficiently deep to permit the lateral movement of the clamp-plate in relation to the throat in the operation of barring. In other words, while the clamp-plate is held down by the extension of the throat-plate over it, and is guided in its movement by the contact of the edge of the slot with the edge of the throat-plate as it is moved or held against the same by the spring-held roller, yet the slot and recess bear such relation to each other that the clamp-plate may have a lateral movement in relation to the throat-plate, the recess $h'$ being sufficiently deep or the slot sufficiently wide to allow this lateral movement to take place.

The throat-plate or button is provided with a deep recess, in order that the clamp-plate may be oscillated or moved during the operation of barring the button-hole. The movement of the clamp-plate during the stitching of the sides and eye of the button-hole is continuous, and the plate is not oscillated, the needle being moved laterally to first enter the button-hole and then the material in forming the stitch. This method of moving the needle laterally is described in the application above referred to, and is common in button-hole-stitching machines. The barring-stitch is, however, longer than the stitch used for finishing the sides and eye, and, if preferable, it is made about double the length of these stitches. In order that a stitch of this length may be formed, it is necessary to oscillate or move the clamping-plate at the end of the stitching of the second or last side of the button-hole, and it is for this reason that the button or throat-plate is provided with a deep recess.

The machine takes as many stitches for forming the bar as may be desired, and the machine is then stopped in the ordinary manner and the clamp-plate returned by hand to its original position, the spring-pin being lifted from the end of the guiding-slot and inserted into the front end of said slot.

The subject-matter of this application was first described in my application for Letters Patent of the United States, filed February 1, 1886, Serial No. 190,525, and has been removed therefrom by amendment; and I would say that I do not claim herein, broadly, first, a reciprocating needle-bar and needle and means for giving it a lateral or out-and-in motion at right angles to the path of its reciprocating motion and the line of feed of a work-holding clamp, in combination with said clamp, a work-clamp feeding device for moving the work-clamp in the line of the length of the button-hole, a support for the work-clamp, an intermittingly-operating stud, block, or post adapted to engage said support, and means to move the same and the work-clamp back and -forth under the needle to increase the length of the overlying stitches forming the stay or bar at the end of the button-hole; second, stitch-forming mechanism, in combination with a clamp-plate or work-holding device and means for feeding forward the same during the stitching of the sides and eye of a button-hole, mechanism for disengaging the clamp-feeding device from the clamp-plate, and an automatically-acting device for imparting an intermittingly oscillating or vibrating movement to the clamp-plate at the end of its forward feeding movement for producing the barring-stitches of a button-hole; third, the combination of a movable plate supporting the work-clamping devices, the throat-plate, a feeding device for feeding the clamping-plate to present the work to the sewing mechanism, the spring-held roll adapted to bear against the edge of the clamping-plate, and the intermittingly-moving stud, pin, or other moving part arranged to engage the clamping-plate and move it automatically at the end of the feed movement.

Having thus fully described my invention, I claim and desire to secure by Letters Patent of the United States—

1. The combination, in a button-hole-stitching machine, of the stitching forming devices, a clamp-plate and clamp, feeding devices for feeding the clamp-plate continuously forward during the stitching of the sides and eye, a tripping stop or block operated or moved by the clamp-plate, devices operated by said tripping stop or block for disconnecting the feed-operating devices to stop the forward movement of the clamp-plate, and a device for giving an intermittent oscillating or vibrating movement to the clamp-plate automatically brought into operation by the movement of the tripping stop or block, substantially as described.

2. The combination, in a machine for stitching button-holes, of a movable plate having a guiding-pin, the said pin, work holding or clamping devices carried by said feeding devices for moving and feeding said plate to present the work to the sewing mechanism, the feed mechanism and guide-slot adapted to hold the end of the said pin at the end of the feed movement of the plate, the devices for operating or moving the said clamping-plate laterally under the needle and upon the said pin as a center, all substantially as described.

3. In a button-hole-stitching machine, the combination of the clamp-plate, feeding device for feeding said clamp-plate operated by a ratchet-wheel and reciprocating pawl, a post, block, or arm adapted to be moved by contact with the clamp-plate therewith, and connecting devices connecting it with the ratchet-wheel and pawl, whereby upon the contact of the clamp-plate with the post, block, or arm the pawl is disengaged and held disengaged from the ratchet, substantially as described.

4. The combination, in a button-hole-stitching machine, of a clamp-plate and mechanism for feeding it, a block, post, or arm adapted to be moved thereby, a latch connected with said block, post, or arm and controlling the operative position of the device for oscillating or reciprocating the clamp-plate, and said clamp-plate oscillating and reciprocating device, substantially as described.

5. The combination, in a machine for stitching button-holes, of the clamp-plate, the tripping block, post, or arm, operated upon the contact of the clamp-plate therewith, and an intermittently-reciprocating post, spindle, or block, for reciprocating the clamp-plate, and mechanism connecting it with the tripping block, post, or arm, substantially as and for the purposes described.

6. The combination of the clamping-plate holding or supporting the work-clamping devices, devices for moving the same to present the work to the stitching mechanism, and an intermittingly-reciprocating post, stud, or block operated by mechanism, substantially as specified, and adapted to engage the clamp-plate and move it, means for moving said post, block, or stud vertically in its support, a spring for moving it in one direction, and a latch for locking it down against the spring-pressure, all substantially as described.

7. The combination, in a button-hole-stitching machine, of the clamping-plate, an intermittingly-reciprocating block, post, or stud having a vertical movement in its carrier or support, and mechanism for reciprocating the same, a spring for moving and holding it upward in relation thereto, and a latch for holding it in its lowest position in relation to the spring, all substantially as described.

8. The combination of the clamping-plate, movable as described, and having the inclined surface $c^7$, with the vertically-movable intermittingly-reciprocating stud, block, or post E, substantially as described.

9. The combination of the clamp-plate, movable as described, having the inclined surface, with the vertically-movable intermittingly-reciprocated block, stud, or post, and mechanism for reciprocating it, and the latch $d^4$, all substantially as described.

10. The combination of the clamp-plate, the slide-bar having a block provided with a recess or hole, the pin or post E, having the section $e$, which enters said recess or hole, and mechanism for intermittently reciprocating the pin or post, and the latch-block $e^7$, the spring $e^6$, and the automatic latch $d^4$, all substantially as described.

11. The combination of the clamp-plate, the slide plate or block supporting the pin, post, or stud E, the cam $e^{12}$, the lever $e^9$, and the connecting-link $e^4$, substantially as described.

12. The combination of the clamp-plate, the tripping-block D, the slide-plate $d'$, the reciprocating block carrying the vertically-movable pin or post E, and the latch $d^4$, substantially as described.

13. The combination of the clamp-plate, the block D, the slide block or bar $d^9$, the arm $d^{12}$, and the covering plate or shield $d^{13}$, adapted, upon the movement of the slide-bar, to be brought over the feed ratchet-wheel and to form a surface upon which the pawl may move, and the said ratchet-wheel and reciprocating pawl, substantially as described.

14. The combination, in a machine for stitching button-holes, of a block or stop, D, and devices for intermittingly reciprocating the clamp-plate, adapted to be moved into operative position upon the release of a latch, said latch connected with said block or stop, a feed-disconnecting device for disconnecting the feed-operating mechanism from the feed roll or wheel, also connected with said block, whereby upon the movement of said block the operation of feeding is discontinued and the clamp-plate-oscillating device automatically brought into operation, all substantially as described.

15. The combination, in a button-hole-stitching machine, of the clamp-plate, the block or stop D and means for adjusting it, substantially as described.

16. The combination, in a button-hole-stitching machine, of an adjustable back-stop, a pointer, $f'$, and the scale $f^2$ and the clamp-plate, all substantially as described.

17. The combination, in a button-hole-stitching machine, of the clamp-plate slot $b$ with the adjustable front stop, G, and the clamp-plate, all substantially as described.

18. The combination, in a button-hole-stitching machine, of the work-plate having the slot $b$, the stop G, and the adjusting-screw $g^6$ and the clamp-plate, substantially as described.

19. The combination, in a button-hole-stitching machine, of the front stop, G, the indicator $g^4$, and the scale $g^5$, with a movable clamp-plate, substantially as described.

20. The combination, in a button-hole-stitching machine, of the clamp-plate, the tripping-block D, a latching device for bringing into operative position a reciprocating block for intermittingly moving the clamp-plate in the operation of barring or staying the button-hole, the said reciprocating block and a latching device for holding the tripping-block D locked back during the said barring movement of the clamp, substantially as described.

21. In a machine for stitching button-holes, the combination of stitching devices, a movable plate supporting the work clamping and holding and presenting devices, and feeding mechanism for automatically moving the plate to present the work to the stitching mechanism, a tripping device for tripping the feed-operating devices, a device for engaging the clamp-plate and intermittingly moving the same in the operation of barring or staying the button-hole, all combined and arranged so that the stitching of the sides and eye is followed by the immediate automatic forming or stitching of the bar or stay, whereby the entire stitched and barred or stayed button-hole is made in one continuous operation of the machine, all substantially as described.

22. The combination, in a button-hole-stitching machine, of the stitch-forming devices, the throat-plate or button having the deep recess $h'$, the clamp-plate having a slot sufficiently wide to permit of its reciprocation in the deep recess $h'$, the clamp-plate-feeding mechanism for providing it with a continuous forward movement during the stitching of the sides and eye of the button-hole, a spring bearing against the clamp-plate for maintaining its edge along its slot in contact with the throat-plate or button during said feed movement, and an intermittingly-reciprocating post or stud adapted to automatically engage the clamp-plate at the end of the feed movement and to reciprocate it in the deep recess $h'$ in opposition to said spring during the forming of the barring-stitch, substantially as described.

JAMES H. REED.

Witnesses:
F. F. RAYMOND, 2d,
J. M. DOLAN.